United States Patent [19]
Lindsey et al.

[11] 3,868,089
[45] Feb. 25, 1975

[54] HELICOPTER THREADABLE STRINGING BLOCK ASSEMBLY FOR POWER CONDUCTORS

[76] Inventors: Keith E. Lindsey, 110 El Nido, Apt. 29; L. E. Lindsey, 2262 E. Mountain Ave., both of Pasadena, Calif. 91107

[22] Filed: Sept. 20, 1973

[21] Appl. No.: 398,952

Related U.S. Application Data

[63] Continuation-in-part of Ser. No. 282,430, Aug. 21, 1972.

[52] U.S. Cl. ......... 254/134.3 PA, 254/193, 254/197
[51] Int. Cl. ............................................. B66d 1/36
[58] Field of Search ........... 254/134.3 PA, 134.3 R, 254/190, 192, 193, 197

[56] References Cited
UNITED STATES PATENTS

| | | | |
|---|---|---|---|
| 2,527,651 | 10/1950 | Pieper | 254/134.3 PA |
| 2,806,380 | 9/1957 | Martin | 254/134.3 PA |
| 3,077,337 | 2/1963 | Cronkright | 254/134.3 PA |
| 3,195,862 | 7/1965 | Sherman | 254/197 |
| 3,479,014 | 11/1969 | Reilly et al. | 254/197 |

*Primary Examiner*—Al Lawrence Smith
*Assistant Examiner*—Robert C. Watson
*Attorney, Agent, or Firm*—Sellers and Brace

[57] ABSTRACT

A converter yoke and stringing block assembly adapted to be threaded with a helicopter-dispensed conductor hauling line dropped thereonto from either side of a power line. The yoke sub-assembly can be used in lieu of a conventional stringing block yoke thereby to convert a manually threaded block for threading by helicopter, or the features of the invention can be embodied in a stringing block as initially manufactured. The separate yoke brackets are spaced apart to provide an open-ended threading passage and the exit end of the latter is initially extended by dislodgeable guide members shiftable to retracted positions automatically as the advance end of the conductors approaches the stringing block, the guide members being thereafter restrained in retracted position until manually reset. A load transfer latch normally interconnects the two brackets of the yoke and includes means for holding the latch open until dislodged by the conductor hauling line as it is threaded through the stringing block or as it is later used to pull a running board along the power line.

40 Claims, 5 Drawing Figures

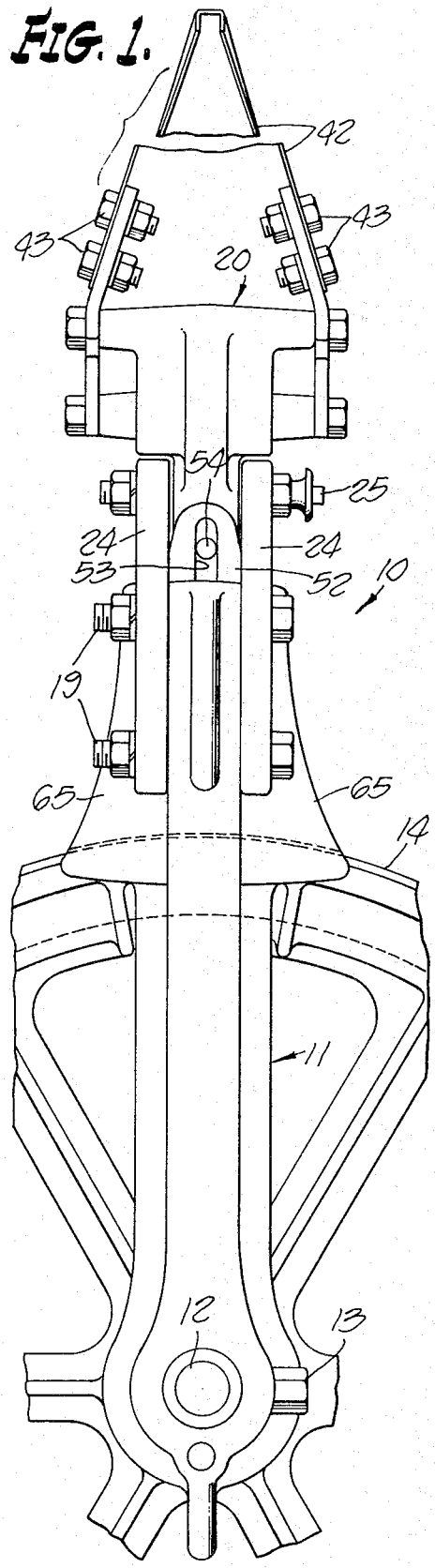
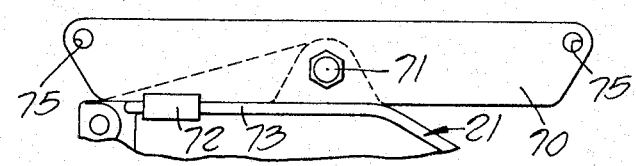
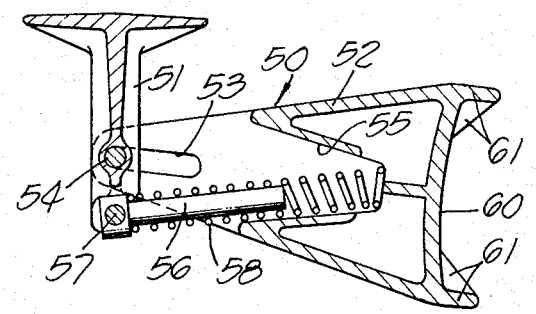
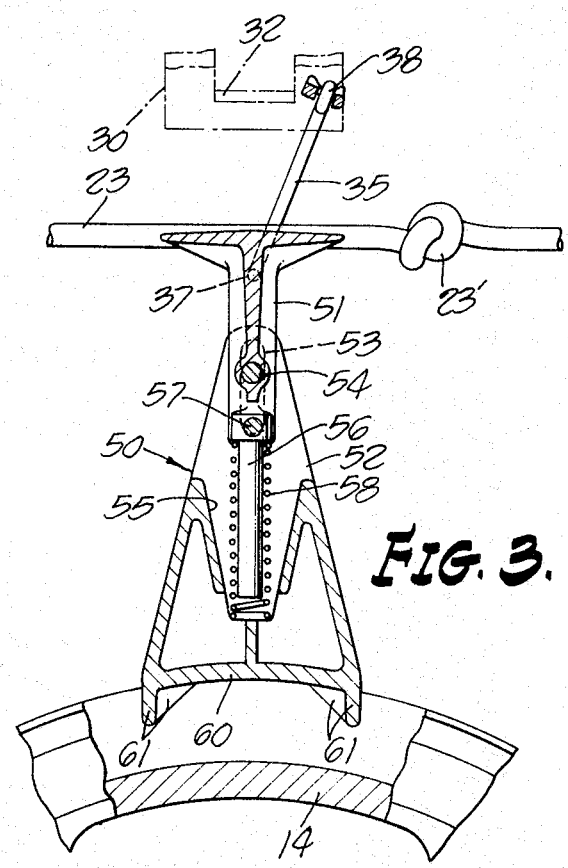

HELICOPTER THREADABLE STRINGING BLOCK ASSEMBLY FOR POWER CONDUCTORS

This is a continuation-in-part of application Ser. No. 282,430, filed 8/21/72.

This invention relates to equipment for stringing power line conductors, and more particularly to a bundle-type power line stringing block and a converter yoke accessory therefore designed to be threaded with a hauling line by helicopter and including means dislodged by the entry of the hauling line to close a load transfer latch and further including hauling line guides which are dislodged to their retracted position by the entry of a conventional running board interconnecting the trailing end of the hauling line and the advance end of the power conductors themselves.

This application embodies certain improvements over the related stringing block assembly disclosed in my copending application for United States letters Patent, Ser. No. 282,430, filed Aug. 21, 1972. The load transfer latch member there disclosed may fail to open by the tension acting in the hauling line as it is dropped from the helicopter. This can be remedied by employing very light spring means urging the latch toward its normal latched position. However, if this expedient is employed the spring strength may be inadequate to assure full and proper closing of the latch after the passage of the hauling line, particularly if foreign matter is present between the parts. In this event, serious damage to the stringing block is almost inevitable as stringing operations proceed with possible disastrous results.

Another undesirable characteristic of the earlier construction disclosed in application Ser. No. 282,430 is that the hauling line guide members 61,62 of that application undesirably obstruct the conductor passageway between sheaves 26,27 and the underside of the stringing block yoke. Furthermore and if made as flexible as is desirable for certain purposes, the hauling line guide members have inadequate strength to serve their intended purpose, particularly along portions of the power line passing around bends in the right of way. Under these circumstances, the stresses imposed on the quide means by hauling cable can seriously damage the guide means. Additionally, it is important that any hindrance to the gravitation of the hauling line occur as near as possible to a vertical center line of the block to avoid imparting rotary force to the block about its suspension axis as tension is applied to the hauling line.

It is therefore the purpose of the present invention to avoid the foregoing and other shortcomings of prior expedients for the helicopter threading of stringing blocks. According to this invention, a captive strut or prop cooperates with the latch and the smaller one of the yoke components to hold the latch positively in open position despite the use of powerful spring means urging the latch closed and which strut is readily dislodged by contact with the conductor hauling line or knot means therein as the latter is being threaded into or pulled through the stringing block. To this end, one end of the strut is pivoted to the lower edge of the latch and its opposite end has shallow seating engagement in recess on the opposite side of the threading passage. A very slight force received from the hauling line or an enlargement carried thereby serves to dislodge the strut from its rest position allowing the powerful spring to close the latch so that the latch thereafter serves as a strong load transfer connection crosswise of the threading passage.

At least one and preferably a pair of powerful hauling line guides are disposed on either side of the exit end of the threading passage. Normally a toggle spring arrangement biases these guide members to one or the other of two retracted positions remote from the stringing block sheaves. However, during hauling line threading operations these guides are manually settable in upright positions forming a narrow extension of the threading passage with the lower ends of the guide members held pressed against a suitable rigid support such as a respective one of the sheaves to either side of the central sheave. This construction provides a very powerful supplemental guide for the hauling line and restrains the latter and maintains it captive on the periphery of the central grooves despite strong forces tending to displace it from the central sheave of stringing blocks located along bends in the power line. The running board normally interconnecting the hauling line to the advance end of the conductors readily displaces the guide members for this manually set position thereby allowing the spring biased means to pivot the guide members to one or the other of the generally horizontal retracted positions completely clear of the conductors being hauled into position along the power line, the direction of pivoting depending on the direction of pull past the block.

Accordingly, it is a primary object of this invention to provide an improved and novel converter yoke accessory and stringing block assembly adapted to be threaded with a helicopter-dispensed conductor hauling line.

Another object of the invention is the provision of a converter yoke accessory readily attachable to the side frames of a bundle type stringing block in lieu of a conventional yoke and having an improved load transfer latch and improved hauling line guide members automatically dislodgeable to an inactive position by the passage of a running board assembly therepast.

Another object of the invention is the provision of a helicopter threadable stringing block having a latch movably supported crosswise of its threading passage and dislodgeable to its normal closed position by a force applied relatively close to the suspension axis of said block.

Another object of the invention is the provision of a helicopter threadable stringing block readily threaded in the same flight direction from either side of a power line while a gate for the threading passage is held open by means readily dislodged by the conductor hauling line while being threaded past said gate.

Another object of the invention is the provision of a converter yoke assembly for a stringing block having hauling line guide members mounted thereon each movable between a stable threading position and one or more stable retracted positions remote from the stringing block sheaves.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary side elevational view of the upper portion of a stringing block assembly embodying the features of this invention and showing the hauling line guide members set in threading position;

FIG. 3 is a fragmentary view on an enlarged scale partly in section taken generally along line 3—3 on FIG. 2 and showing a knot in the hauling line approaching the strut for the latch;

FIG. 4 is a view similar to FIG. 3 but showing one of the guide members supported firmly in its retracted position; and FIG. 5 is a fragmentary view through the upper yoke member having an alternate suspension adapter secured thereto.

Figure 2:
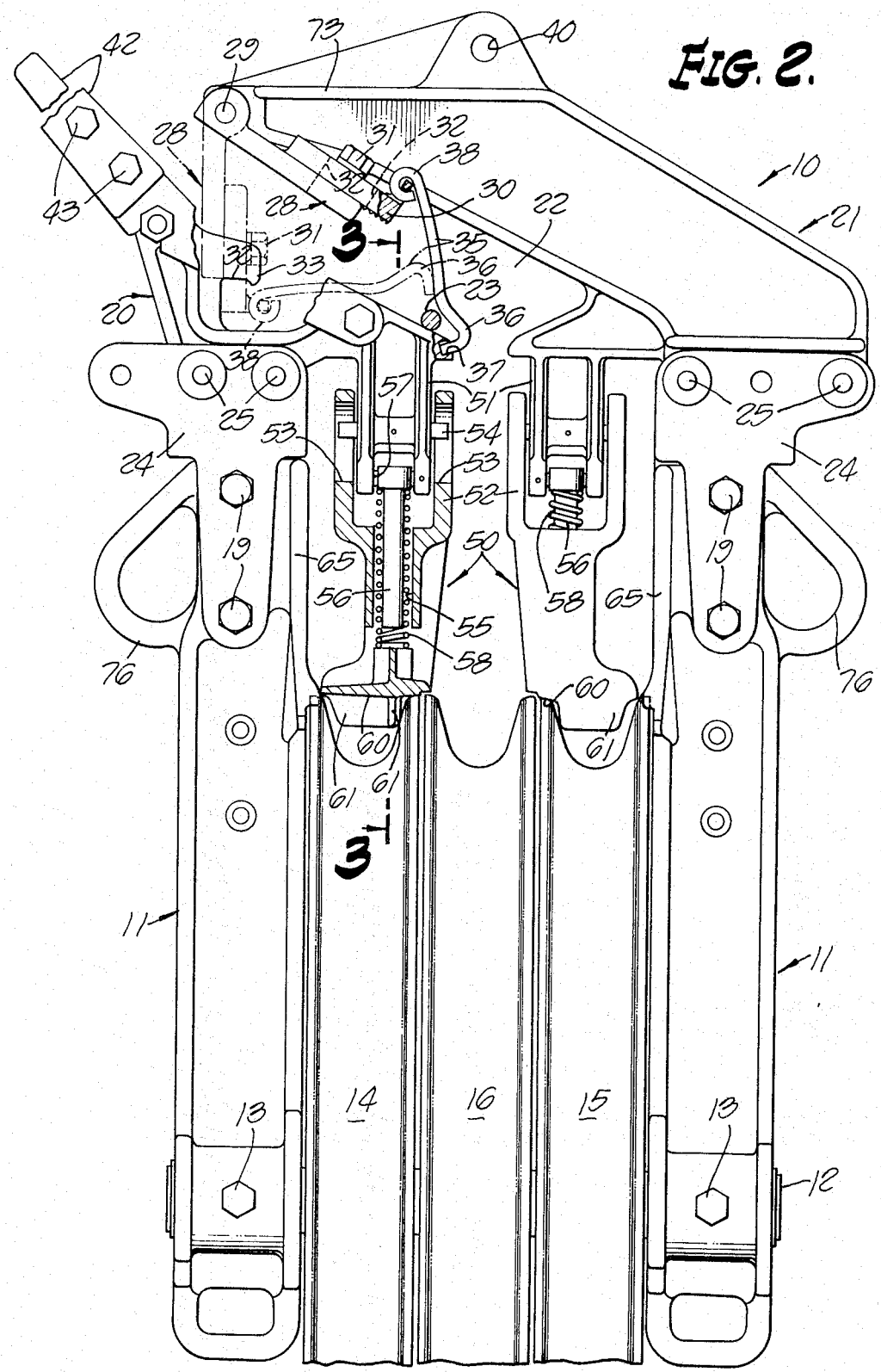
FIG. 2 is a fragmentary end view of the stringing block assembly shown in FIG. 1 with the load transfer latch cocked in threading position.

Referring initially more particularly to FIGS. 1 and 2, there is shown a bundle-type stringing block, designated generally 10, incorporating the features of this invention. This block comprises a pair of side frames 11,11 rigidly connected to the opposite ends of a shaft 12 by bolts 13. As there shown for use to string a dual pair of bundle conductors are a pair of sheaves 14,15 located to either side of a central sheave 16.

The upper ends of side frames 11,11 project very substantially above the upper rims of sheaves 14,15,16 and may be connected to a unitary yoke, not shown, of conventional construction by which the stringing block assembly can be suspended from the lower end of a power line insulator or other suitable support. Such yokes are customarily secured to the upper ends of side frames 11,11 by bolts 19.

This conventional unitary yoke is shown replaced in the present drawings by the invention converter yoke assembly which comprises two yoke members 20,21 extending toward one another from the upper ends of the side frames with their adjacent edges spaced apart to provide a threading passageway 22 to be described in greater detail presently. Yoke members or brackets 20,21 are rigidly secured to the upper ends of the side frames 11,11 by pairs of adapter plates 24,24 and pairs of bolts 19,19 and pairs of pins 25,25. It will be understood that adapter plates 24 may be furnished in different designs and dimensions as necessary to accommodate the invention converter yoke assembly for attachment to stringing block assemblies of different size and constructions. Thus, as is well known to those skilled in this art, such blocks differ considerably in size and dimension and include a detachable yoke secured across the top of the side frames by suitable fasteners. This yoke is removed and the appropriate design of adapter plates 24 is utilized to connect the universal helicopter-threadable converter yoke assembly of this invention to the side frames of any conventional stringing block.

Threading passage 22 for the hauling line 23 of the type used in this manner described in my copending application referred to in the opening paragraphs of this disclosure, has an inlet end opening laterally through one side of the stringing block and is normally maintained closed by a gate or latch 28 having multiple functions. The lower outlet end of the threading passage 22 opens downwardly directly over center sheave 16. Latch 28 is hinged to yoke member 21 by pivot pin 29 and is spring-biased to closed position by a torsion spring, not shown but encircling the pivot pin. The free end of the latch includes an adjustable plate 30 clamped to latch member 28 by cap screws 31. The midlength of the latch is provided with an opening 32 for receiving a detent 33 integral with yoke member 20.

As shown in FIG. 2, latch 28 is held in its retracted or open position by a strut or prop 35 having a hooked end 36 seated in a shallow well 37 of yoke member 20. The upper end of strut 35 has an eyelet 38 pivotally assembled to the edge of latch member 30. It will be observed that the lower end of strut 35 forms a downwardly converging passage with the adjacent upper surface of yoke member 20 with the result that line 23 is highly effective in camming strut 35 out of well 37 to release latch 28. Hence only a slight force applied from the left of strut 35 by the hauling line as it gravitates downwardly along threading passage 22 suffices to dislodge the hooked end of the strut from well 37, thereby allowing the aforementioned torsion spring to close latch 28 to the vertical dot and dash line closed position thereof with its opening engaged over detent 33. In this position the latch is highly effective in transferring high load stresses between the free end of yoke member 21 and the underlying portion of yoke member 20 and thereby to the left hand side of the stringing block assembly. In this connection it will be understood that the stringing block is normally suspended by a clevis or other suitable connection opening 40 in the upper midlength portion of yoke member 21. If by chance strut 35 is not dislodged in the manner described above a knot or the like 23' in the hauling line assures release of the latch as knot 23' is pulled past and beneath strut 35.

As is best shown in FIG. 2, the free end of a strut or prop 35 is preferably located reasonably close to a vertical line through the center of the block in order that tension forces acting in line 23 will have a minimum tendency to rotate the block about its vertical axis and a maximum of effectiveness in dislodging prop 35.

A receiving or guide horn 42 is secured to yoke member 20 by cap screws 43 and provides an upwardly inclined prolongation of the lower edge of threading passage 22. Normally horn 42 extends outwardly several feet from the left hand edge of the stringing block and catches the hauling line as it is dispensed from the reel carried by a helicopter flying along the power line.

Referring now more particularly to FIGS. 2, 3 and 4 there are shown details of the guide units for the conductor hauling line to assure that it drops through the exit end of the threading passage 22 directly into the groove of center sheave 16. These guide means or units include duplicate linkages, designated generally 50, having a lost motion pivotal connection to brackets 51 extending downwardly from yoke members 20 and 21. The principal moving element of each guide unit comprises a strut 52 having a pair of aligned slots 53 extending lengthwise of its forked upper end which forked ends straddle brackets 51. These brackets have a pin 54 fixed thereto and projecting from the opposite lateral sides into the slotted openings 53 of members 52. The central portion or members 52 are provided with a downwardly converging tubular passage 55 (FIGS. 3 and 4) in which is seated a headed pin 56. A cross pin 57 extends through the head pin 56 and its ends are journalled in the notched lower end of bracket 51. A relatively strong compression spring 58 surrounds pin 56 with its lower end pressed against the bottom of the tapering opening 55. The lower ends 60 of guided members 52 are convex and have a radius conforming generally to the radius of the rim of sheaves 14,15 and the opposite ends of this arcuate surface are provided with reinforcing ribs 61 which project downwardly into the groove of sheaves 14,15.

As shown in FIG. 3, the axes of shaft 12 and of pins 54,57 lie in a common vertical plane. Accordingly, when the guide members 52 are positioned as shown in FIGS. 2 and 3, spring 58 holds the guide members firmly seated against the juxtaposed rims of sheaves 14,15. The relatively wide arcuate ends 60 of members 52 cooperate with brackets 51 and the opposite ends of pins 54 to provide a strong, stable toggle support for the guide members and this is particularly true as respects forces acting transversely of the stringing block, that is axially of shaft 12. However, a much smaller force acting against either the forward or rear edges of members 52 is effective to compress spring 58 sufficiently to permit members 52 to be swung either clockwise or counterclockwise about the axis of pivot pins 54. If either the forward or the rear edge of members 52 pass a vertical line through the axes of pins 54,57 and shaft 12, then the spring 58 is effective to continue the pivotal swinging movement of either guide member to its alternate stable position indicated in FIG. 4 wherein this member is supported in a substantially horizontal position thereby leaving the passageway overlying the tops of sheaves 14,15,16 unobstructed and clear for the passage of the conventional running board and the bundle conductors through the stringing block and on toward the next stringing block. Accordingly, it will be clear that the guide members 52 remain in their extended active position illustrated in FIGS. 2 and 3 until the running board conventionally interconnecting the trailing end of the hauling line and the advance end of the bundle conductors contacts one transverse edge of the members 52. When this occurs, the guide members are upset from their extended vertical position whereupon springs 58 continue the pivotal movement of the toggle-type guide members to their retracted horizontal positions shown in FIG. 4.

Referring to FIGS. 1 and 2 it will be noted that the upper ends of side frames 11 preferably include guard flanges 65 cast integral with their upper inner transverse edges which guard flanges embrace the upper exterior rim portions of sheaves 14,15. Guard flanges 65 aid in guiding the running board and holding it centered between the stringing block side frames while passing through the stringing block and they also serve similar purposes as respects the conductors should the latter climb up the sides of the flanges of sheaves 14,15 particularly along curves in the power line and abrupt changes in elevation.

Referring now to FIG. 5, there is shown an alternate arrangement for supporting the stringing block from an insulator. To this end there is shown a suspension adapter 70 having a length corresponding generally to the length of yoke member 21 and having a bore transversely of its mid-portion to receive an assembly bolt 71 holding adapter 70 assembled to opening 40. Additionally, adapter 70 includes U-shaped clips 72 projecting laterally from the opposite sides of the left-hand end of adapter 70 and sized to slidingly receive the reinforcing ribs 73 extending horizontally along the lateral edges of yoke member 21. The opposite ends of adapter 70 are provided with openings 75 by which the stringing block is suspendable in well known manner from the tower or from the lower end of the insulator to which the bundle conductors are to be attached.

The operation and use of the converter yoke components and the stringing block to which they are attached will be quite evident from the foregoing detailed description. It will be understood that the stringing blocks are suspended from insulators distributed along the power line with the guide horns 42 facing outwardly along one outer lateral side of the power line and in position to receive a conductor hauling line as it is dispensed from a reel on board a helicopter flying along the power line. The trailing end of this hauling line is attached to conventional running board means having its rear end firmly attached to the bundle conductors to be strung.

After or at the time the stringing clocks are secured in place on the lower end of the insulator, the workmen takes care to cock latch 28 to the full line position shown in FIG. 2 with the lower end 36 of strut 35 firmly seated in well 37. At the same time the workman makes certain that each of the guide members 50,50 is pivoted to its vertical extended position with the lower end 60 pressed against the upper edges of a respective one of sheaves 14,15. After all of the stringing blocks have been prepared in this manner, the helicopter flies along the power line and drops the hauling line onto first one and then another of the guide horns 42. The hauling line gravitates downwardly along these horns into the entrance end of threading passage 22 and contacts or engages the lower hooked end 36 of strut 35 thereby easily and positively dislodging this strut from well 37. Immediately, the torsion spring encircling pivot pin 29 of latch 28 snaps the latch closed to embrace and engage latch detent 33. As this occurs the hauling line drops downwardly between the two guide units 50,50 into the groove of central sheave 16.

After the hauling line has been thus installed and threaded onto the central sheave of each of the stringing blocks, the advance end is disconnected from the helicopter and connected to ground-supported winch means to advance the bundle conductors through each of the stringing blocks 10. Throughout the threading operation of the hauling line as well as during winching of the hauling line through the stringing blocks, guide members 52 strongly resist any tendency of the hauling line to escape from the groove of sheave 16 by riding up out of the groove of central sheave 16, a tendency which is likely to arise around curves or changes in elevation of the power line.

As the advance end of the running board contacts the transverse edge of members 52, it easily pivots these members forwardly out of engagement with sheaves 14,15 until toggle springs 58 become effective to snap the snap members 52 to their fully retracted position shown in FIG. 4 or to the alternate stable position thereof on the left side of member 51. The members are thereafter firmly held in this position until forcibly and manually reset in their extended positions in readiness for the rethreading of another conductor hauling line.

It should also be pointed out that during advance winching of the hauling line and of the conductors latch 28 remains firmly and positively engaged with detent 33 with the result that it interconnects yoke members 20,21 so that the very high loads carried by the stringing block are shared by both yoke members and particularly by the opposite ends of the longer yoke member 21.

After the conductors have been installed along one side of the power line they are rotated 180° so that the entrance to threading passage 22 faces outwardly and then installed and used as previously described to string bundle conductors along the other side of the line. All parts function in the same manner described previously except that the guide linkages 50,50 are contacted from their other edges and pivot in the opposite direction to their alternate stable positions upon being contacted by the advance end of the running board.

Although the conductor hauling line has been described herein as dispensed from a reel mounted on suitable aircraft, such as a helicopter, it will be understood that the supply reel need not be mounted on the air-borne craft but can be mounted at ground level and pulled into position along the power line while being delivered or threaded to the stringing blocks. Accordingly, these terms as used in the claims are to be understood as embracing either mode for mounting the hauling line reel. It will also be understood that the central sheave employed to receive the conductor hauling line may be similar to the other sheaves or it may be a special sheave such as one having annular flanges projecting laterally from the rims of its groove structure, such as a grooved drum.

While the particular helicopter threadable stringing block assembly for power conductors herein shown and disclosed in detail is fully capable of attaining the object and providing the advantages hereinbefore stated, it is to be understood that it is merely illustrative of the presently preferred embodiment of the invention and that no limitations are intended to the detail of construction or design herein shown other than as defined in the appended claims.

We claim:

1. That improvement in a power line stringing block assembly having means for suspending the same adjacent a power line insulator and adapted to be aircraft-threaded with a conductor hauling line and of the type having a main frame including a shaft interconnecting and extending between the upright legs thereof and supporting at least three sheave-like members in side by side relation and which main frame has an upwardly and outwardly extending threading passage between the upper ends of said legs, which improvement comprises: guide means disposed between the inner end of said passage and a generally central one of said sheaves to provide a temporary prolongation of said passage to guide a conductor hauling line only onto said generally central sheave as it is delivered thereto from an aircraft and gravitates downwardly through said passage, and said guide means including means for holding the same temporarily in place until deliberately dislodged from the effective operating position thereof and thereafter effective to hold said guide means in an alternate position displaced from said central sheave.

2. That improvement defined in claim 1 characterized in the provision of load-transmitting means normally positioned across said threading passage for a conductor hauling line and interconnecting the legs of said main frame between the opposite ends of said threading passage, and means for holding said load transmitting means disengaged and retracted out of a position interfering with the threading of a conductor hauling line through said stringing block assembly.

3. That improvement defined in claim 2 characterized in the provision of means for holding said load transmitting means in retracted position to permit passage of a conductor hauling line therepast and including means for deactivating said holding means and permitting said load transmitting to resume the aforesaid normal position thereof as an incident to the reception of a conductor hauling line in said threading passage.

4. That improvement defined in claim 1 characterized in the provision of means for supporting said guide means on said main frame in either of two positions in one of which said guide means cooperate in guiding a conductor hauling line onto the generally central one of said sheaves and in the other of which said guide means are dislodged and held in an inactive position out of contact with the conductors being hauled into position along a power line.

5. That improvement defined in claim 1 characterized in that said guide means comprises at least one spring biased toggle linkage assembly movably supported on said main frame and movable between first and second stable positions and operable in said first stable position to hold said guide means in the extended position thereof to guide a conductor hauling line onto said generally central sheave and operable in the second stable retracted position thereof to hold said guide means retracted and out of the path of conductors while being hauled through said stringing block assembly.

6. That improvement defined in claim 5 characterized in that said guide means comprises a pair of generally similar toggle linkage assemblies supported for pivotal movement through arcs in parallel planes between the legs of said U-shaped main frame.

7. That improvement defined in claim 6 characterized in that said toggle linkage assemblies include spring means for selectively holding each assembly extended and effective to guide a conductor hauling line while being threaded through a stringing block assembly or retracted and displaced out of the path of conductors being pulled through said stringing block assembly.

8. That improvement defined in claim 5 characterized in that said toggle linkage assembly includes means for holding the same selectively in any one of a plurality of retracted positions depending upon the direction in which said hauling line is passing through said stringing block assembly.

9. That improvement defined in claim 1 characterized in the provision of gate means normally in closed position crosswise of said threading passage and pivotally connected to the upper edge of said passage near one end thereof.

10. That improvement defined in claim 9 characterized in the provision of means for holding said gate means open during threading of said threading of said threading passage which holding means is adapted to be dislodged by a conductor hauling line while gravitating downwardly along said threading passage in an area thereof adjacent the vertical center line of said stringing block assembly.

11. That improvement defined in claim 10 characterized in the provision of means operatively associated with said gate means for moving and holding the same closed normally and upon the dislodgment of said holding means.

12. An aircraft threadable stringing block assembly for use in stringing bundle-type power line conductors, said stringing block assembly comprising a pair of said frames rigidly interconnected to the opposite ends of a shaft rotatably supporting in side by side relation a plurality of grooved sheave-like members, means for suspending said side frames from a power line insulator and including an open-ended passage for threading an aircraft delivered conductor hauling line therethrough for guidance onto the central one of said sheave-like members, guide means disposed to either side of the outlet end of said passage for guiding a conductor hauling line as it gravitates from the outlet end of said passage toward said central sheave-like member, said guide means including means for holding the same releasably in a stable position while guiding a conductor hauling line onto said central sheave-like member and including means actuatable by means attached to a conductor hauling line to dislodge said guide means to a retracted second position offering no obstruction to the passage of power line conductors through said stringing block assembly with each conductor resting in the groove of a respective one of said sheave-like members.

13. A stringing block assembly as defined in claim 12 characterized in that the upper ends of said side frames extend toward one another in spaced-apart overlapping relation thereby to provide said open-ended threading passage therebetween which passage opens outwardly past one of said side frames.

14. A stringing block assembly as defined in claim 13 characterized in the provision of guide horn means extending outwardly and upwardly from and forming a continuation of the lower side of said passage to intercept and channel a conductor hauling line into said passage after being dropped thereonto from a helicopter dispensing reel.

15. A stringing block assembly as defined in claim 13 characterized in the provision of load transmitting latch means movably supported on the leg forming one side of said passage and normally latched to a portion of the leg on the opposite side of said passage thereby to interconnect said legs with a load transmitting barrier extending crosswise of said threading passage.

16. A stringing block assembly as defined in claim 15 characterized in that said latch means includes means normally effective to hold the same in closed latching position.

17. A stringing block assembly as defined in claim 15 characterized in the provision of means for holding said latch means temporarily open to permit movement of a conductor hauling line therepast along said passage.

18. A stringing block assembly as defined in claim 15 characterized in the provision of strut means for holding said latch means temporarily open and so positioned as to be displaced by contact with a conductor hauling line after the latter passes said latch means while moving along said passage.

19. A stringing block assembly as defined in claim 13 characterized in the provision of separate hauling line guide means movably mounted on the legs of said side frames along the opposite sides of said passage adjacent the lower outlet end thereof and effective to guide a conductor hauling line from said passage onto a central one of said sheaves.

20. A stringing block assembly as defined in claim 19 characterized in that said guide means include means for holding the same selectively in a selected one of a plurality of stable positions.

21. A stringing block assembly as defined in claim 20 characterized in that said holding means for said guide means comprises spring-biased toggle linkage means operable in a first position thereof to hold guide units extended toward a respective side of said central sheave and operable in a second position thereof to hold said guide units retracted in a position remote from each of said sheaves.

22. In combination, a bundle-type power line stringing block assembly having a plurality of sheaves rotatably supported between a pair of rigid side frames equipped with means for supporting said assembly by suspension adjacent the lower end of a power line insulator, said side frames cooperating to provide an open-ended threading passage through which an aircraft-delivered conductor hauling line can be dropped for gravitation onto a central one of said sheaves, and a pair of guide means supported along the opposite sides of the exit end of said passage effective to guide said hauling line onto said central sheave and inclufing means for holding each of said guide means in an inactive positon remote from said sheaves after a hauling line has been threaded onto said central sheave.

23. The combination defined in claim 22 characterized in that said guide means has two stable positions in one of which said guide means lies extended toward the opposite lateral sides of said central sheave and in the second of which said guide means is held retracted in an inactive position remote from each of said sheaves.

24. The combination defined in claim 22 characterized in that said guide means includes toggle spring means operable in one stable position to hold the lower end of said guide means pressed against the juxtaposed rim edge of one of said sheaves and operable at other times to hold said guide means retracted and remote from said sheaves.

25. The combination defined in claim 22 characterized in that said guide means are responsive to contact with an object attached to the trailing end of a conductor hauling line to dislodge said guide means and automatically shift the same to said inactive position as said object is hauled therepast thereby leaving the area closely overlying said sheaves free and unobstructed for hauling bundle-type conductors through said stringing block assembly.

26. The combination defined in claim 22 characterized in that said guide means include means rigidly and substantially immovably supporting the same in an active upright position so long as a conductor hauling line is being pulled through said stringing block assembly.

27. The combination defined in claim 22 characterized in that the outer free ends of said guide means are broader than a single one of said sheaves in a direction extending in a plane normal to the axis of said sheaves and shaped to bear against the peripheries thereof in areas spaced to either side of a vertical bisector plane through the sheave axis.

28. The combination defined in claim 27 characterized in the provision of spring means sufficiently strong to hold the outer free end each of said guide means firmly seated against said sheaves until the trailing end of a conductor hauling line is being pulled past said guide means.

29. A converter yoke accessory attachable across the upper ends of the side frames of a stringing block assembly for use to thread said assembly with a conductor hauling line while the line is being delivered by an airborne craft, said yoke accessory comprising a pair of brackets each rigidly securable to the upper end of a respective one of the stringing block side frames and having adjacent edges of said brackets cooperating to provide an open-ended threading passage having an exit end overlying a middle sheave of the stringing block assembly, conductor hauling line guide means movable depending from the opposite sides of the exit of said passage and providing supplemental guide means for the hauling line while being threaded to a stringing block and thereafter bodily shiftable to a retracted position remote from the stringing block sheaves, and mean for retaining said guide means in retracted position.

30. A converter yoke accessory as defined in claim 29 characterized in that each of said guide means includes an elongated member having one end pivoted to a respective one of said brackets for swinging movement in parallel planes on either side of the exit end of said passage, and spring means normally effective to bias said guide means normally pivoted to the retracted position thereof.

31. A converter yoke accessory as defined in claim 30 characterized in that the outer free end of each of said guide means is adapted to be pressed against the rim edge of a sheave by said spring means when installed on a stringing block assembly and thereby held in a stable positon to guide a conductor hauling line onto a sheave.

32. A converter yoke accessory as defined in claim 29 characterized in that one of said brackets is sufficiently long to span the distance between the side frames of a stringing block assembly to which the upper ends of said brackets are securable, and the other of said brackets being relatively short and adapted to underlie and be spaced between said longer bracket thereby to form said hauling line passage.

33. A converter yoke accessory as defined in claim 32 characterized in the provision of load transfer latch means pivoted to the underside of said longer bracket near the free end thereof and spring biased into latching engagement with detent means carried by the shorter of said brackets, and means for holding said latch open and adapted to be dislodged from latch holding position by a conductor hauling line passing along said passage.

34. A converter yoke accessory as defined in claim 33 characterized in that said holding means comprises a pivoting strut having one end engageable with the shorter one of said brackets and its other end engageable with said latch to hold the same open until said strut is dislodged by a conductor hauling line.

35. A converter yoke accessory as defined in claim 34 characterized in that the longer one of said brackets includes means in the mid-length thereof for suspension of a stringing block assembly to which said yoke accessory is secured from adjacent the lower end of a power line insulator.

36. A stringing block assembly having a hauling line threading passage adapted to be threaded by aircraft, gate means movably supported crosswise of said threading passage and normally closed to prevent escape therepast of a hauling line previously threaded through said passage, means for normally biasing said gate means to the closed position thereof, and holding means for holding said gate means open and engageable by a hauling line passing along said threading passage effective to dislodge said holding means thereby permitting said biasing means to close said gate means as an incident to the passing of the hauling line therepast.

37. An assembly as defined in claim 36 characterized in that said hauling line has means for engaging and dislodging said holding means as said hauling line is being dropped for gravitation into said threading passage.

38. That improvement defined in claim 1 characterized in the provision of load-transmitting means located across said threading passage for a conductor hauling line which load transmitting means is movable between first and second stable positions, said load-transmitting means being operable in said first stable position to permit a conductor hauling line to pass along said threading passage after being dispensed thereinto from an aircraft and being thereafter operable in said second position to transmit load stresses crosswise of said threading passage between portions of said main frame to either side of said passage.

39. That improvement defined in claim 38 characterized in that said load-transmitting means includes means responsive to the movement of a conductor hauling line along threading passage to induce the shifting of said load transmitting means from said first to said second stable position.

40. A stringing block as defined in claim 15 characterized in that said latch means is movable to a non-latching second position and includes means while in said second position permitting the passage of a conductor hauling line along said threading passage onto said central sheave and responsive to the movement of a hauling line therepast to induce the movement of said latch means to the normal latching position thereof.

* * * * *